Dec. 17, 1963  F. R. LARSEN  3,114,426
ATTACHMENT STEERING APPARATUS FOR TOWABLE VEHICLES
Filed July 10, 1961  3 Sheets-Sheet 1
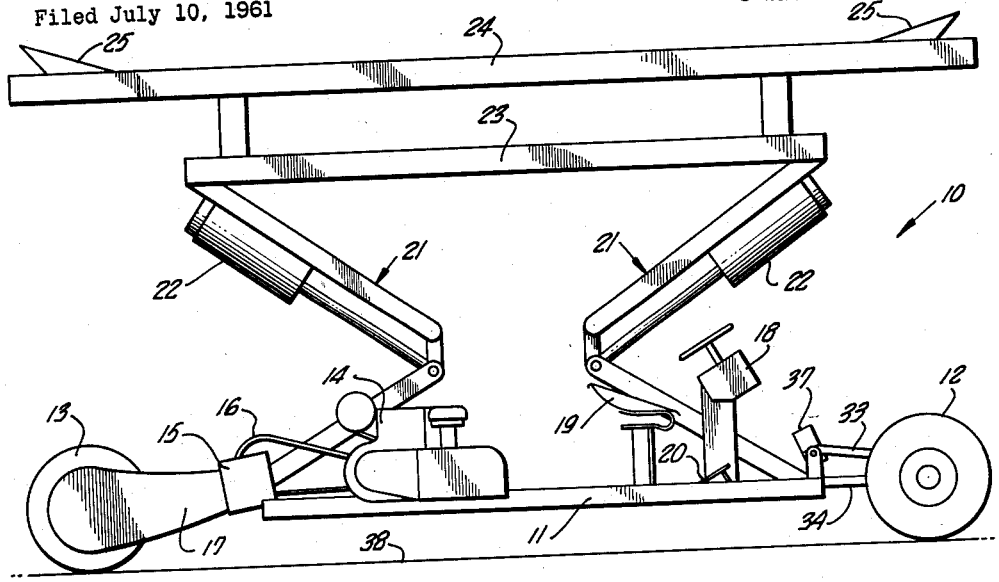
FIG_1_
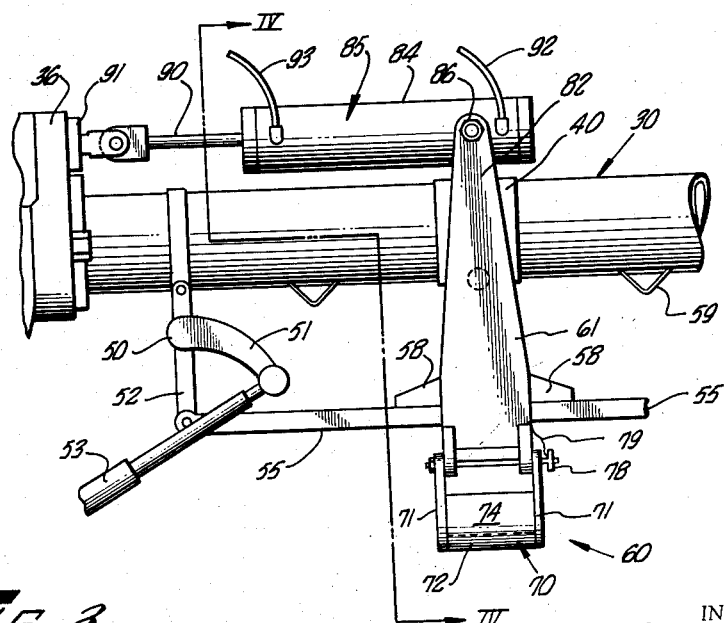
FIG_3_
INVENTOR.
FRANK R. LARSEN
BY
ATTORNEYS.

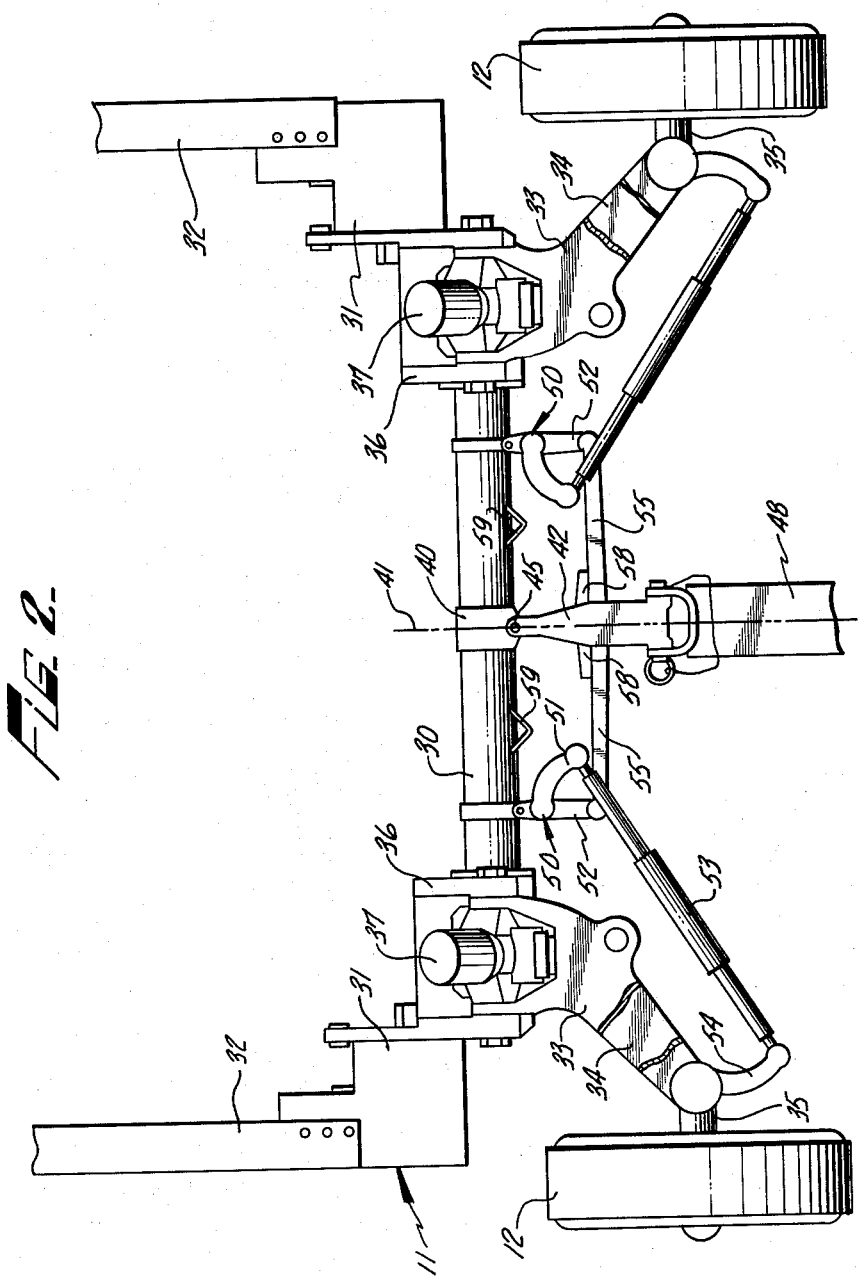

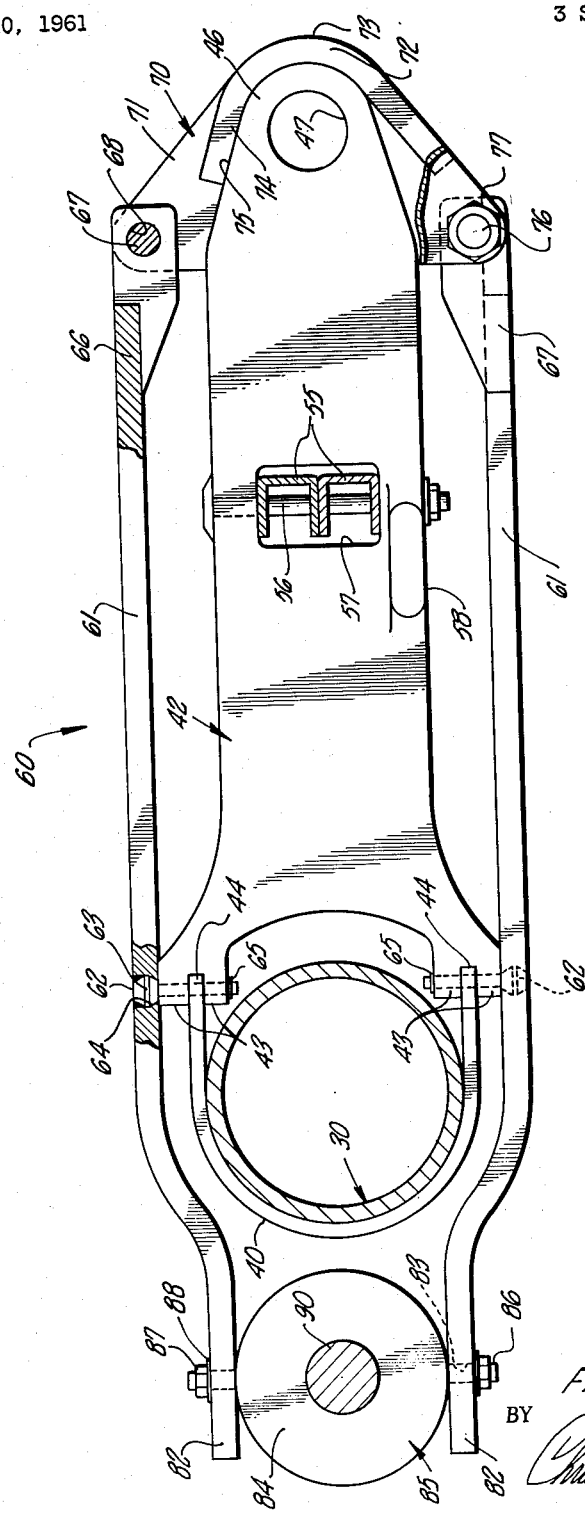

United States Patent Office 3,114,426
Patented Dec. 17, 1963

3,114,426
ATTACHMENT STEERING APPARATUS FOR TOWABLE VEHICLES
Frank R. Larsen, Temple City, Calif., assignor to Air Logistics Corporation, Pasadena, Calif., a corporation of California
Filed July 10, 1961, Ser. No. 123,051
7 Claims. (Cl. 180—79.2)

This invention relates to steering apparatus. More particularly it relates to steering equipment which is attachable to a vehicle originally fitted for towing. The apparatus of the invention is compatible with the original structure of the vehicle, and can be disengaged readily from the towing equipment through a mechanical interlock.

Throughout industry there are found many vehicles which originally were intended for movement by towing, but in many cases it is desirable that these vehicles be modified to be self-propelled. Usually, when such a situation is encountered, an internal combustion engine is attached to the originally towable vehicle to provide such self-propulsion. Quite often, however, modifications to the original steering systems are required which destroy the towable characteristics of the vehicle. Once the election to mechanize the vehicle is made, it is an "either/or" situation; the vehicle must either be self-propelled or entirely towable. This invention provides a steering apparatus for installation in conjunction with the mechanization of an originally towable vehicle which is compatible with the original equipment of the towable vehicle.

While many different types of vehicles exist in industrial and domestic applications, the presentation of the apparatus provided by this invention is made in conjunction with a jet engine service cart. Such vehicles particularly demonstrate the advantages derived when a vehicle can be both self-propelled and towed.

With the provision of larger and larger airplanes, the requirements for runway and hangar space have increased. In many areas of the world where climates are suitable, the airplanes are parked out-of-doors around the runways. In installations such as this the service and repair hangars are often remote from aircraft storage locations. In such cases, say when an engine of the aircraft is serviced, a specially adapted service cart is run out to the airplane and the engine is removed and taken to the enclosed servicing area. Where long distances are travelled between the plane and the hangar it is often most economical to tow the cart behind a tractor; higher speeds can be attained than if the vehicle were driven by its low power engine. However, in the repair base itself it is often necessary to maneuver the vehicles over short distances. In these cases where maneuvering space does not permit the use of a tractor, the self-propelled features of the service trailer are highly desirable. The apparatus provided by this invention assures rapid and simple conversion from a self-propelled steering condition to a towable steering and maneuvering condition.

Generally speaking, this invention provides disconnectible steering apparatus for a vehicle which can be either self-propelled or towed. In broadest terms, the vehicle has at least one front wheel and at least one rear wheel mounted rotatably to a chassis. At least one of these wheels is mounted to the chassis such that the plane of rotation of the wheel is variably alignable relative to the chassis to provide for steering of the vehicle. An elongated member is pivoted to the chassis at one of its ends and is adapted at the other end for connection to a towing vehicle. Apparatus is connected between the elongated member and the variably alignable wheel such that the alignment of the one wheel is varied in response to variations in alignment of the elongated member relative to the chassis. The steering apparatus for use during self-propelled movement of the vehicle and provided by this invention comprises means positively but removably engageable with the elongated member. Link or lever means are pivotally mounted to the chassis adjacent the pivot point of the elongated member and are connected to the means engageable with the elongated member. A mechanism for pivoting the link means relative to the chassis is operably connected to the chassis for steering the vehicle when the elongated member engaging means and the elongated member are positively engaged. The elements of the apparatus provided by this invention are compatible with the original equipment provided on the vehicle for steering the vehicle when it is towed. When the elongated member is disengaged from the link means, the wheels may be steered independently of any restriction or loading provided by the mechanism for pivoting the link means.

The following detailed discussion and description of the invention is made in conjunction with the accompanying figures, wherein:

FIGURE 1 is a side elevational view of a mechanized aircraft engine service cart;

FIGURE 2 is an enlarged plan view of the front end of the service cart illustrating the steering equipment as originally provided on the cart and adapted for towing the vehicle;

FIGURE 3 is a plan view of the steering mechanism illustrating the apparatus provided by this invention installed in conjunction with the original equipment of the vehicle; and FIGURE 4 is an enlarged cross-sectional view, with additional parts broken away, of the attachment steering apparatus and is taken along line IV—IV of FIGURE 3.

FIGURE 1 illustrates an aircraft engine service cart 10 particularly adapted for servicing of jet engines. The cart 10 has a chassis 11, a pair of front wheels 12, and a pair of rear wheels 13. One of the rear wheels 13 is provided with a self-propulsion system including an internal combustion engine 14, a gearbox 15, a chain drive 16 between the engine 14 and the gearbox 15, and a second drive link 17 between the gearbox 15 and one of the rear wheels 13. In conjunction with the internal combustion engine 14, a steering pedestal 18 is provided at the front end of the chassis 11, together with a driver's seat 19. A gas pedal 20 is mounted to the chassis 11 for regulation of the internal combustion engine 14. Normally, however, the vehicle 10 is provided with no means for driving the vehicle, but here the motor 14 has been added in mechanizing the vehicle.

Articulated link or lever systems 21, operated by hydraulic rams 22, are mounted on the chassis 11. The articulated linkages 21 are connected to a longitudinal bridge unit 23 which mounts a frame 24, having gussets or brackets 25 at opposite ends thereof particularly suited for engagement with a jet engine In use, the vehicle 10 may be driven or towed to adjacent the underside of an airplane. The hydraulic mechanisms 22 are operated so that the frame 24 rests against the underside of the jet engine. The engine is then disconnected from the plane and transferred to the frame 24. The engine is lowered and the vehicle is driven or towed to a servicing area for detailed examination and overhaul.

A hydraulic pump (not shown) is driven by the internal combustion engine 14 and powers the hydraulic rams 22. Alternatively, the hydraulic cylinders 22 may be manually operated. A second and separate pump (not shown) is mounted to the chassis 11 when the steering apparatus of this invention is added to the vehicle 10 and supplies power to the ram 85. This pump may double as the power source for the rams 22.

Referring to FIGURE 2, the steering and wheel mounting apparatus normally provided with the cart 10 is illustrated. In this case it is assumed the vehicle was originally equipped for towing only and was not self-propelled. In order to comprehend the utility and flexibility of the steering apparatus provided by this invention, it is necessary to have an understanding of the original equipment of the cart 10. The chassis 11 has a front end transverse member 30 in the form of a tubular structural member. Structure fitting assemblies 31 are secured to the longitudinal structural members 32 of the chassis to mount the tubular transverse member 30. An upper 33 and a lower 34 pivoted wheel mounting arm extend forwardly from each front corner of the chassis 11 to mount a ball joint spindle and axle member 35 between their forward ends. The front wheels 12 are rotatably mounted to the spindles 35. One member of a pair of brackets 36 is mounted to the transverse member 30 adjacent each fitting assembly 31. The arms 33 and 34 are pivoted between the fitting assemblies 31 and the adjacent brackets 36. A hydraulic wheel biasing or actuating cylinder 37 is connected between the arms 33 and 34 between the brackets 36 and the fitting assemblies 31. Actuators 37 are operated to increase or decrease the clearance of the chassis 11 relative to the ground 38.

A forwardly opening U-clamp or bracket 40 is secured to the forward transverse chassis member 30 along the longitudinal axis 41 of the vehicle 10. An elongated tongue or tow bar 42 is pivoted in articulated connection to the forward ends 44 of the legs of the U-shaped bracket 40 (see FIGURE 4). The tow bar or tongue 42 has two pairs of clevis lugs 43 which span the forward ends 44 of the U-bracket 40. A pair of pivots 45 are engaged through the lugs 43 and the U-clamp ends 44. The forward end 46 of the tongue or drawbar 42 has a transverse hole 47 drilled therethrough and provides engagement with an extension drawbar 48 (see FIGURE 2) which is connectible to a tractor for towing the cart 10.

A crank 50 having arms 51 and 52 is pivotally mounted to the transverse chassis member 30 between the U-clamp 40 and each wheel mounting arm bracket 36. A rigid tie rod 53 extends between each crank arm 51 and a crank arm 54 integral with each of the adjacent ball joint spindles 35. A cross link 55 is pivotally connected between each of the crank arms 52 and the tongue 42. As illustrated more specifically in FIGURE 4, the cross links 55 are of channel configuration and are connected to the tongue 42 by a pivot pin 56 engaged vertically through a transverse aperture 57 in the tow bar 42.

A stop lug 58 extends laterally from the lower mid-length of each side of the drawbar 42. A bracket 59 is mounted to the forward side of the tubular member 30 on either side of the U-bracket 40. In operation, the stop lugs 58 and the brackets 59 limit the amount of pivoting of the tongue 42, and hence limit the degree of movement of the wheels 12.

The apparatus described thus far is that which is normally supplied on a cart 10 which is intended to be towed. The attachment steering apparatus provided by this invention is added to the existing unmechanized trailer or cart 10 in such a manner that no structural modifications are required to be made to the original equipment of the trailer.

FIGURE 3 illustrates the steering apparatus 60 provided by this invention as installed upon the existing original equipment of the towable cart 10. A pair of link or pivot arms 61 are provided (see FIGURE 4) and have pivot points 62 included therein. The pivot members 62 have enlarged chamfered heads 63 which are fitted into a prepared recess 64 in each arm 61. The heads 63 are welded into the recesses 64 to provide a substantially integral portion of the pivot arms 61. These pivot members 62 replace the pivot pins 45 originally connecting the clevis lugs 43 of the tongue 42 to the ends 44 of the U-clamp or U-brackets 40. During installation of the arms 61 to the original equipment of the cart 10, the pivots 62 are passed through the U-clamp 40 and tongue 42 and are secured by retainer clips or rings 65. The link arms 61 are thus pivoted coaxially with the tongue 42.

A pair of pivot lugs 67 are provided at the forward end 66 of each of the link arms 61. Each lug projects beyond the end of the arm 66 and has a circular aperture 68 provided transversely thereof. A socket or tongue engageable member 70 is located between the pivot arm lugs 67. The socket assembly 70 has a pair of side plates 71 of substantially triangular configuration. Each side plate 71 has an aperture in opposite corners of the same diameter as aperture 68 in pivot arm lug 67. A tongue engaging front plate 72 extends between the side walls 71 of the socket assembly 70 and is configured so as to securely engage the tongue 42. The plate 72 extends from adjacent the lower corners of the side plates 71 along the forward edges thereof and around the forward corner 73 of each of the side plates 71. From the forward corner or point 73, the front plate 72 has a portion 74 which extends upwardly and inwardly between the side plates 71 in such a manner as to lie directly against the upward forward surface 75 of the tongue 42. The lower points of the socket assembly side walls 71 are secured to the lugs 67 by a bolt 76 and nut 77 combination. In this respect the socket 70 may be said to be permanently and pivotally mounted to the lower link arm 61. The upper link arm 61 is disconnectibly engaged with the socket assembly 70 by means of a quick-release bolt 78 tethered by thong 79 to the drawbar 42 (see FIGURE 3).

The rear ends 82 of the pivoted link arms 61 extend rearwardly from the transverse chassis structural member 30 and are offset parallelly inwardly with respect to one another. Coaxial apertures or holes 83 are drilled in the rear ends of the arms 61. The actuating cylinder 84 of a double-acting hydraulic ram 85 is connected between the rear ends 82 of the link arms 61. A pair of coaxial lugs 86 extend vertically from the cylinder 84 and are engaged within the apertures 83 to be secured to the link arms 61 by nuts 87 and washers 88. The piston 90 of the ram 85 extends substantially parallel to the chassis structural member 30 and is pivotally mounted to a lugged bracket 91 secured to the rear portion of the adjacent wheel arm mounting bracket 36. Hydraulic lines 92 and 93 are fitted to opposite ends of the actuating cylinder 84 and extend to suitable valving means coupled to the hydraulic pump (not shown) provided in conjunction with the engine 14.

The steering apparatus 60 comprised of elements 61 through 93 as provided by this invention is fully adaptable to a steerable and towable vehicle without structural modification to the original equipment. Only the original pivot pins 45 connecting the drawbar tongue 42 to the chassis 11 need be removed to connect the steering assembly 60 to the vehicle 10.

Operation of the vehicle, once the steering apparatus 60 has been installed, is extremely simple and versatile. If it is desired that the vehicle 10 be operated under its own power, then the drawbar socket assembly 70 is engaged with the forward end 46 of the drawbar 42 as illustrated in FIGURES 3 and 4. When the socket 70 is thus engaged, the sides of the tongue 42 are securely engaged between the side walls 71 of the socket 70 and the portion 74 of the forward plate 72 may be engaged against the upper surface 75 of the tongue 42. In this manner a positive mechanical connection or fit is achieved between the socket 70 and the tongue 42. The ram 85 is actuated to pivot the link arms 61. As the link arms 61 move, the positive connection between the socket 70 and the tongue 42 causes the tongue 42 to follow the motion of the pivot arm 61. In this manner pivotal motion of the link arms 61 is transferred to the forward wheels 12.

If it is found that it is advantageous to tow the cart 10, then the quick-release bolt 78 is disengaged from between the socket 70 and upper pivot arm 61 allowing the socket 70 to swing downwardly about the bolt 76. The extension drawbar 48 is then engaged with the tongue 42 for towing of the cart 10. When the socket 70 is disengaged from the tongue 42, the tongue 42 is free to pivot relative to the chassis 11 without interference from the ram 85. If it were otherwise, the tongue 42 would have to work against the load induced by the fluid of the ram 85.

While the invention has been described above in conjunction with specific apparatus, this has been by way of example only and is not to be considered as a limitation to the scope of this invention.

What is claimed is:

1. Disconnectible steering apparatus for a vehicle having self-propelled and towable states, the vehicle having at least one front wheel, at least one rear wheel, a chassis, means for rotatably mounting the wheels relative to the chassis, the plane of rotation of one of the wheels being variably alignable relative to the chasis, articulation means pivoted to the chassis and adapted for connection to means for towing the vehicle, and means connected in the same manner between the articulation means and the one wheel in both the self-propelled and towable states of the vehicle for varying the alignment of the plane of rotation of the one wheel in response to variations in alignment of the articulation means relative to the chassis, the steering apparatus comprising, in combination means securely but removably engageable with the articulation means, link means pivotally mounted to the chassis adjacent the articulation means and connected to the articulation means engageable means, and means operably connected to the link means for pivoting the link means relative to the chassis for steering the vehicle when the articulation means engageable means is securely engaged, wherein the wheel is completely freed from restriction by the link means pivoting means when the articulation means engageable means is disengaged whereby the vehicle is maneuverable during towing of the vehicle independently of the connection and operation of the link means pivoting means.

2. In a self-propelled vehicle having a chassis including a transverse member at one end thereof, means for self-propelling the vehicle, a pair of spaced-apart pivotable wheels mounted to the chassis one end, and wheel pivoting means comprising a pivoted axle for each of the wheels, arm means extending from the chassis and pivotably mounting the axle, an elongated tongue member hinged at one end to the chassis transverse member centrally of the wheels and adapted at its other end for connection to means for towing the vehicle, and link means pivotably connected between the tongue member and each pivotable wheel; the improvement residing in attachment apparatus for steering of the vehicle in self-propelled travel which is compatible with and disconnectible from the wheel pivoting means for maneuvering the vehicle independently of the attachment apparatus when the vehicle is towed, the attachment apparatus comprising a link arm pivoted to the chassis coaxially of the tongue member hinge, socket means engageable with the tongue member other end hinged to one end of the link arm, selectively operable means for securing the socket means relative to the link arm in engagement with the tongue member, and means operably connected between the other end of the link arm and the chassis for pivoting the link arm, whereby engagement of the socket means with the tongue member permits pivotal motion of the link arm to be transferred to the wheels for steering of the vehicle through the agency of the operably connected means, and whereby disengagement of the socket means from the tongue member permits towing means to be connected to the towing member and the vehicle to be maneuvered thereby free from resistance by the operably connected means.

3. Apparatus according to claim 2 wherein the selectively operable means comprises a quick release bolt.

4. Apparatus according to claim 2 wherein the means operably connected between the other end of the link arm and the chassis comprises a double acting hydraulic ram.

5. Disconnectible steering apparatus for a self-propelled and towable vehicle having at least one front wheel, at least one rear wheel, a chassis, means for rotatably mounting the wheels relative to the chassis, the plane of rotation of one of the wheels being variably alignable relative to the chassis, articulation means pivoted to the chassis and adapted for connection to means for towing the vehicle, and means connected between the articulation means and the one wheel for varying the alignment of the plane of rotation of the one wheel in response to variations in alignment of the articulation means relative to the chassis, the steering apparatus comprising means securely but removably engageable with the articulation means, a pair of link arms pivotally mounted to the chassis intermediate of their length and coaxially of the connection of the articulation means to the chassis, the pair of link arms being connected to the articulation means engageable means, and means operably connected to the link arms for pivoting the link arms relative to the chassis for steering the vehicle when the articulation means engageable means is securely engaged, wherein the articulation means is freed by restriction from the link arm pivoting means when the articulation means engageable means is disengaged whereby the vehicle is maneuverable during towing of the vehicle independently of the connection and operation of the link arm pivoting means.

6. Steering apparatus according to claim 5 wherein the means securely but removably engageable with the articulation means comprises a socket member pivotally linked to one end of one of the link arms and releasably secured to the adjacent end of the other link arm.

7. Disconnectible steering apparatus for a self-propelled and towable vehicle having at least one front wheel, at least one rear wheel, a chassis, means for rotatably mounting the wheels relative to the chassis, the plane of rotation of one of the wheels being variably alignable relative to the chassis, articulation means pivoted to the chassis and adapted for connection to means for towing the vehicle, and means connected between the articulation means and the one wheel for varying the alignment of the plane of rotation of the one wheel in response to variations in alignment of the articulation means relative to the chassis, the steering apparatus comprising means securely but removably engageable with the articulation means, a link arm pivotally mounted to the chassis intermediate of its length and coaxially of the connection of the articulation means to the chassis, the link arm mounting the articulation means engageable means, and means operably connected to the link arm for pivoting the link arm relative to the chassis for steering the vehicle when the articulation means engageable means is securely engaged, wherein the wheel is freed by restriction from the link arm pivoting means when the articulation means engageable means is disengaged whereby the vehicle is maneuverable during towing of the vehicle independently of the connection and operation of the link arm pivoting means.

References Cited in the file of this patent

UNITED STATES PATENTS

| | | |
|---|---|---|
| 1,312,788 | Keller | Aug. 12, 1919 |
| 2,383,216 | Runyan | Aug. 21, 1945 |
| 2,559,142 | Woodworth | July 3, 1951 |
| 2,592,194 | Schmalzreid | Apr. 8, 1952 |
| 2,845,258 | Cornett | July 29, 1958 |
| 2,930,631 | Voorhees | Mar. 29, 1960 |